United States Patent [19]

Imai et al.

[11] 4,418,288

[45] Nov. 29, 1983

[54] ROTATION DETECTOR

[75] Inventors: Yutaka Imai; Jiro Nakano; Motoharu Ezaki, all of Aichi, Japan

[73] Assignees: Toyota Jidosha Kogyo Kabushiki Kaisha, Toyota; Nippondenso Company Limited, Kariya, both of Japan

[21] Appl. No.: 343,364

[22] Filed: Jan. 27, 1982

[30] Foreign Application Priority Data

Jan. 29, 1981 [JP] Japan ................................ 56-11808

[51] Int. Cl.³ ............................................ H01H 35/00
[52] U.S. Cl. .................................. 307/117; 250/233; 340/672; 324/175; 307/122
[58] Field of Search .................. 307/120, 122, 132 R, 307/132 M, 117; 340/671, 672; 250/232, 233; 356/141, 221, 226; 324/175

[56] References Cited

U.S. PATENT DOCUMENTS

| | | | |
|---|---|---|---|
| 3,743,837 | 7/1973 | Povley et al. | 307/117 X |
| 3,755,687 | 8/1973 | Garnett | 307/117 |
| 3,956,628 | 5/1976 | Hanger | 250/232 X |
| 4,172,994 | 10/1979 | Bergkuist | 324/175 |
| 4,195,291 | 3/1980 | Burks, Jr. | 340/671 |

*Primary Examiner*—Elliot A. Goldberg
*Assistant Examiner*—D. Jennings
*Attorney, Agent, or Firm*—Cushman, Darby & Cushman

[57] ABSTRACT

A rotation detector wherein a rotary disk formed with slits in the circumferential direction thereof at predetermined regular intervals and connected to a driving source is disposed between a light emitting element and a light receiving element, and the light sensed by the light receiving element is intermittenlly interrupted by rotation of the rotary disk, whereby rotation of the driving source is detected. One of the rotation detectors is of such an arrangement that a parallel circuit is constituted by a resistor and a series circuit including a feedback resistor and a switching element, and this parallel circuit connects a power source and a light emitting element. Additionally, another of the rotational detectors is of such an arrangement that a comparator, in which a reference level is set, is used to compare outputs from a light emitting element with the reference level. As the result, misdetection occurring when the quantity of light sensed by a light receiving element is as low as one half and misdetection caused by external factors mixed in from the power source system and the like.

11 Claims, 8 Drawing Figures

ROTATION DETECTOR

BACKGROUND OF THE INVENTION

This invention relates to rotation detectors, and more particularly to a rotation detector suitable for use in a digitl type speedometer used in a vehicle such as a motor car.

Description in detail will hereunder be given of an example of the digital type speedometers with reference to the drawings. In addition, same reference numerals are used throughout the figures to designate members or elements having the same or similar functions. FIG. 1 shows an arrangement of a digital type speedometer, in which designated at reference numeral 2 is a transmission of a motor car and the transmission 2 is provided therein with a rotary drive shaft 4 rotatable in association with a rotary drive shaft, not shown, of an engine. As shown in FIG. 2, a rotary member 6 formed thereon with slits 6A disposed at regular intervals in the circumferential direction thereof is fixed to the forward end portion of the rotary shaft 4. The peripheral edge portion of the rotary member 6 is inserted in a light path of a photo-electric transducer (A photo-interruptor is used as the photo-electric transducer in this embodiment) constituted by an emission diode 8 and a light receiving element 10 (such as a photo-transistor).

Furthermore, denoted at 14 is a signal processing circuit for receiving output signals from the photo-electric transducer 12 to calculate the vehicle speed, and a calculation output from the signal processing circuit 14 is digitally indicated by an indicator 16.

Description will hereunder be given of an example of a detecting circuit of a digital type speedometer of the prior art shown in FIG. 1 with reference to FIGS. 3 and 4.

This detecting circuit is constituted by a photo-interruptor 12 and a detecting portion in the signal processing circuit 14. FIG. 3 shows the arrangement of the detecting circuit, in which the battery 18 is parallelly connected thereto with a series circuit of an emission diode 8 constituting the photo-interruptor 12 and a bias resistor 20.

Further, the battery 18 is parallelly connected thereto with a series circuit of a photo-transistor 10 for receiving a light emitted from the emission diode 8 through the rotary member 6, not shown, and resistors 22 and 24.

Additionally, the resistors 22 and 24 are connected to the base of a transistor 26, the collector of which is connected to an anode of the battery 18 and an emitter of which is connected to the cathode of the battery 18, respectively.

In the abovedescribed embodiment, the emission diode 8 constituting the photo-interruptor 12 and the resistor 20 are biased into a favorable direction and in continuity.

On the other hand, the light emitted from the emission diode 8 is intermittently interrupted by the rotation of the rotary member 6 (Refer to FIGS. 1 and 2) interposed between the photo-transistor 10 and the emission diode 8, the interrupted light causes an electric current shown in FIG. 4(A) to flow from the emitter of the photo-transistor 10 to the base of the switching transistor 26 through the resistor 22 in accordance with the rotating condition of the rotary member 6. As a result, pulse train signals shown in FIG. 4(B) are outputted from the collector, i.e. the output terminal 30 of the switching transistor 26. These pulse train signals are received in an operation circuit in the signal processing circuit 14 (Refer to FIG. 1) to calculate the vehicle speed.

Here, when the slits 6A of the rotary member 6 shut by about half the light path between the emission diode 8 and the photo-transistor 10, the photo-transistor 10 for detecting the light emitted from the emission diode 8 operates in an active region thereof, whereby the output level of the photo-transistor 10 comes into a mean level between the logical "1" and "0".

In this state, when external noises, switching noises from a power source in the case of using a DC/DC converter as the power source, noises caused by mechanical vibrations of the rotary member and the like are mixed with the output signals from the photo-transistor 10, the output level is fluctuated being centered about the mean level of the output signals, thereby leading to such a disadvantage that, irrespective of that the vehicle speed (rotational number) is 0 km/h for example, a misdetection is effected to indicate an unusually high vehicle speed.

SUMMARY OF THE INVENTION

The present invention has as its object the provision of a rotation detector for preventing misdetection in the rotation caused by noises from a power system, external noises and the like.

A first characteristic feature of the present invention resides in a rotational number detector, wherein a rotary member having slits and being rotatably driven by a driving source is inserted in a light path, and intermittently interrupted states of the light in accordance with the rotation of the rotary member are sensed to detect the rotation of the rotary member, being of such an arrangement that the detector comprises: an emission element biased into a favorable direction, a light receiving element for sensing the light emitted from the emission element through the rotary member, and switching means operable in response to an output from the light receiving element; and a feedback resistor is provided between an output end of the switching means and a cathode of said emission element.

A second characteristic feature of the present invention resides in a rotational number detector, wherein a rotary member having slits and being rotatably driven by a driving source is inserted in a light path, and intermittently interrupted states of the light in accordance with the rotation of the rotary member are sensed to detect the rotation of the rotary member, being of such an arrangement that the detector comprises: an emission element biased into a favorable direction; a light receiving element for sensing the light emitted from the emission element through the rotary member; and a comparator for comparing an output from the light receiving element with a reference voltage to output pulse signals corresponding to the rotational number of the rotary member.

As has been described hereinabove, the present invention can provide a rotational number detector being free from misdetections in the rotational number (vehicle speed) caused by the mixing of noises from the power system or external noises.

BRIEF DESCRIPTION OF THE DRAWINGS

The above-mentioned features and objects of the present invention will become more apparent by reference to the following description taken in conjunction with the accompanying drawings, wheein like referenced numerals denote like elements, and in which.

DETAILED DESCRIPTION OF THE INVENTION

Figure 1:
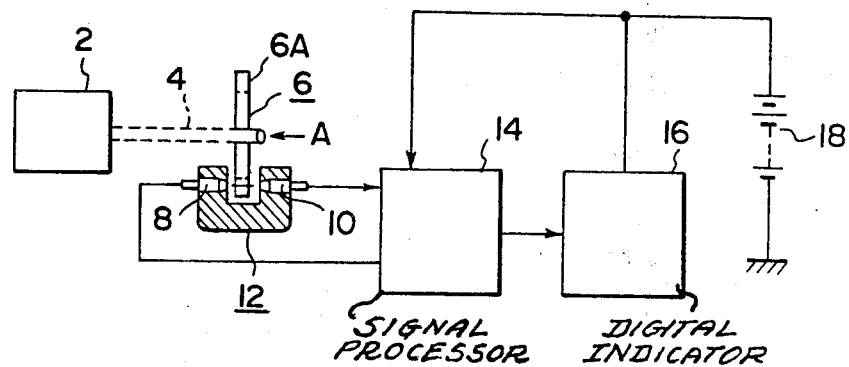
FIG. 1 is a block diagram showing the arrangement of the digital type speedometer.
Figure 2:
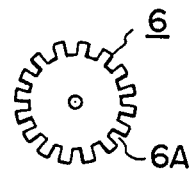
FIG. 2 is a view of the rotary member 6 in the direction indicated by an arrow A in FIG. 1.
Figure 3:
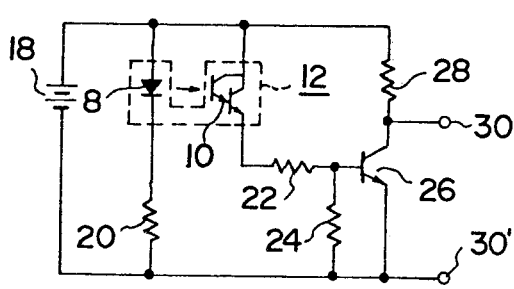
FIG. 3 is a circuit diagram showing the arrangement of the conventional detecting circuit in the digital type speedometer.
Figure 4:
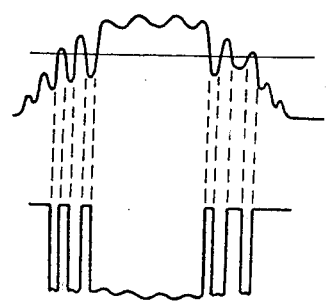
FIG. 4 are waveshape diagrams of the respective portions in explanation of the operation of the detecting circuit shown in FIG. 3.
Figure 5:
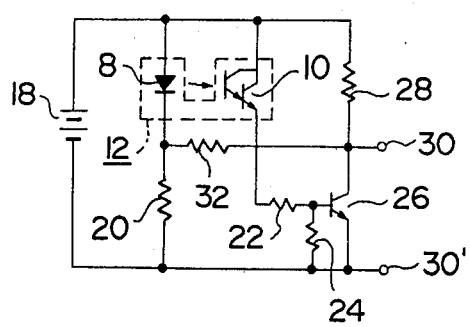
FIG. 5 is a circuit diagram showing the arrangement of an embodiment of the detecting circuit in the rotational number detector according to the present invention.
Figure 6:
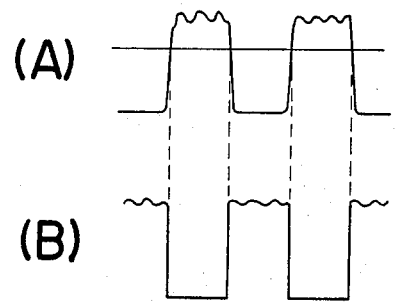
FIG. 6 are waveshape diagrams of the respective portions in explanation of the operation of the detecting circuit according to the present invention.

Description will hereunder be given of an embodiment of the present invention with reference to FIGS. 5 and 6. FIG. 5 shows the arrangement of a detecting circuit in a digital type speedometer. A difference between this embodiment and the conventional example shown in FIG. 3 resides in that, in this embodiment, a positive feedback resistor 32 is provided between a cathode of an emission element, e.g. the emission diode 8 constituting the photo-interruptor 12 and a collector of the switching transistor 26. While, there is no difference in the other portions of the arrangements therebetween, so that detailed description thereof will be omitted.

In the abovedescribed embodiment, when the marginal portion of the rotary member 6 fully shuts off the light path, the light emitted from the emission diode 8 is not transmitted to the photo-transistor 10, wherely the photo-transistor 10 is in a cut-off state (Refer to FIG. 6(A)), with the result that a bias current does not flow to the base of the switching transistor 26 to bring the transistor 26 into a cut-off state, so that a logical "1" signal is outputted from the output end 30 of the detecting circuit 30 as shown in FIG. 6(B). At this time, a current at a certain level to be determined by the resistor 20 flows to the emission diode 8 to cause the emission diode 8 to emit a predetermined quantity of light.

On the other hand, when the marginal portion of the rotary member shuts the light path by about half, the transistor 10 and the switching transistor 26 operate in the active regions in the initial stage, whereby the presence of the positive feedback resistor 32 brings about a state being equivalent to a state where the resistor 32 is parallelly connected to the resistor 20 through the switching transistor 26, so that a bias resistor connected in series to the emission diode is decreased in resistance value.

Cousequently, the bias current flowing to the emission diode 8 is increased in value, resulting in increased quantity of light emitted.

As a result, the photo-transistor 10 is brought into a saturated state, whereby the switching transistor 26 is also brought into a saturated state, so that the level of signal at the output end 30 is rapidly transferred from the mean level to a logical "0" level.

When the photo-transistor 10 and the switching transistor are transferred from saturated states to the cut-off states contrary to the above, the bias resistor of the emission diode 8 becomes higher in resistance value than a resistance value determined by the parallel circuit including the resistors 20 and 32 because the switching transistor 26 operates in the active region, whereby the bias current flowing to the emission diode 8 is decreased in value, resulting in decreased quantity of the light emitted.

As a result, the photo-transistor 10 and the switching transistor 26 are brought into the cut-off states, so that the level of signal at the output end 30 is rapidly transferred from the mean level to logical "1" level.

As described above, in this embodiment, when the photo-transistor 10 is subjected to a transition from one stabilized state to another stabilized state, the detected output from the detecting circuit is adapted to be positively fed back to the emission element (emission diode) in such a manner that the period of time, during which the output level in the detecting circuit casued by this state of transition stays at the mean level between the logical "1" and "0", comes to be the minimum, so that the rotational number of the rotary member (or vehicle speed) can avoid being misdetected.

Figure 7:
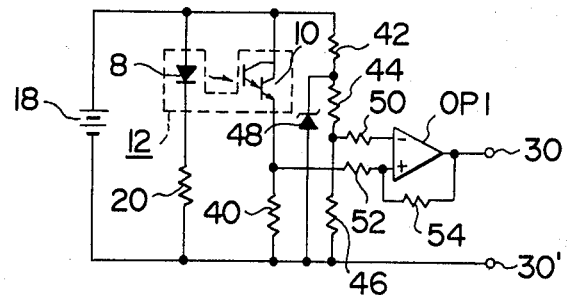
FIG. 7 is a circuit diagram showing the arrangement of another embodiment of the detecting circuit in the rotational number detector according to the present invention.
Figure 8:
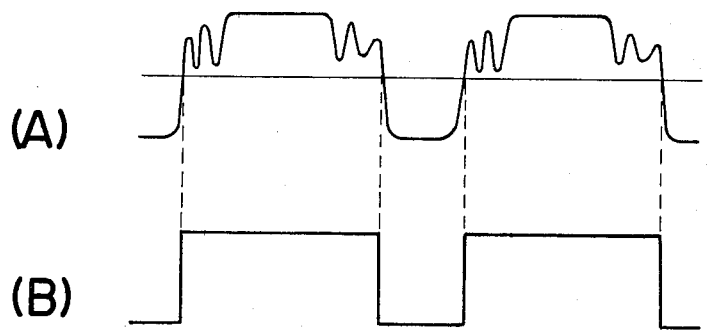
FIG. 8 are waveshape diagrams of the respective portions in explanation of the operation of the detecting circuit shown in FIG. 7.

Description will now be given of another embodiment of the present invention with reference FIGS. 7 and 8. A difference in arrangement between the embodiment shown in FIG. 7 and the embodiment shown in FIG. 5 resides in that, in the former, there is provided a comparator constituted by resistors 42, 44, 46, 50, 52, 54, a Zener diode 48 and an operation amplifier OP1 instead of the switching transistor 26, without providing the feedback resistor 32 for positively feeding back the output from the detecting circuit to the emission diode. Other portions are entirely identical therebetween, so that overlapped description will be omitted.

In the abovedescribed embodiment, inputted to an inverted input terminal of the operation amplifier OP1 is a reference voltage of a predetermined value (comparation level) set at a constant value by the resistors 42, 44, 46 and the Zener diode 48 through an input resistor 50.

On the other hand, the output from the photo-transistor 10 is inputted to a non-inverted input terminal of the operation amplifier OP1 through an input resistor 52 (Refer to FIG. 8(A)). Here, a gain of the operation amplifier OP1 is determined by the input resistor 52 and a feedback resistor 54.

Outputted from the output end of the operation amplifier OP1 are pulse signals indicating the logical "1" level when the input signal level exceeds the preset comparation level irrespective of the input signal level being within the mean level, as shown in FIG. 8(B).

This embodiment can offer such advantages that the same effects as those displayed by the embodiment shown in FIG. 5 are achieved and the detection output is free from the noises caused by the mechanical vibrations of the rotary member 6.

In addition, the case of fixing the comparison level has been described in this embodiment. However, in this embodiment, the accuracies in detection in the detecting circuit may be improved by regulating the comparison level.

From the foregoing description, it should be apparent to one skilled in the art that the above-described embodiment is but one of many possible specific embodiments which can represent the applications of the principles of the present invention. Numerous and varied other arrangements can be readily devised by those skilled in the art without departing from the spirit and scope of the invention.

What is claimed is:

1. A rotation detector, comprising:
   light emitting means adapted to be energized for emitting light;
   light receiving means for sensing the light emitted from said light emitting means and providing output signals;
   rotary means interposed between said light emitting means and said light receiving means, and adapted to be rotatably driven by a driving source, for causing the light emitted from said light emitting means to be sensed in intermittently interrupted states by the light receiving means; and
   means, including switching means turned ON or OFF in response to signals outputted from said light receiving means, for increasing the luminous intensity of said light emitting means when said switching means is turned ON and for decreasing the luminous intensity of said light emitting means when said switching means is turned OFF.

2. A rotation detector as in claim 1 wherein said increasing and decreasing means includes feedback resistor means connected between an output of said switching means and said light emitting means.

3. A rotation detector as in claim 2 including second resistor means and wherein said light emitting means has a cathode connected by said second resistor means to a reference potential and said switching means includes transistor means having an input electrode connected to receive said output signals from said light receiving means and an output electrode connected by said feedback resistor means to said cathode for effectively placing said feedback resistor means in parallel with said second resistor means when said transistor means is at least partially ON whereby the light from said light emitting means is increased to cause through said light receiving means an urging of said transistor means into a saturated ON state.

4. A rotation detector, comprising:
   an emission diode whose anode is connected to a positive pole of a power source and whose cathode to a negative pole of said power source;
   a photo-transistor whose collector is connected to a positive pole of said power source;
   a rotary disk formed with slits in the circumferential direction thereof at predetermined regular intervals, interposed between a light emitting portion of said emission diode and a light receiving portion of said photo-transistor, and rotatably driven by a driving source, for causing the light emitted from said emission diode to be sensed in intermittently interrupted states by said photo-transistor;
   a switching transistor whose base is connected to the emitter of said photo-transistor and whose collector is connected to a positive pole of said power source; and
   a feedback resistor connects the cathode of said emission diode and the collector of said switching transistor.

5. A rotation detector as set forth in claim 4 wherein resistors connect the cathode of said emission diode and the negative pole of said power source, the emitter of said photo-transistor and the base of said switching transistor, the base and the emitter of said switching transistor, and the collector of said switching transistor and the positive pole of said power source, respectively, and an output end is provided on the collector of said switching transistor.

6. A rotation detector, comprising:
   light emitting means adapted to be energized for emitting light;
   light receiving means for sensing the light emitted from said light emitting means and providing output signals;
   rotary means interposed between said light emitting means and said light receiving means, and adapted to be rotatably driven by a driving source, for causing the light emitted from said light emitting means to be sensed in intermittently interrupted states by the light receiving means;
   switching means turned ON or OFF in response to said output signals from said light receiving means;
   wherein said light emitting means is an emission diode biased in a favorable direction and said light receiving means is a photo-transistor; and further comprising:
   a first resistor connecting the cathode of said emission diode and the negative pole of said power source;
   a second resistor connected at one end thereof to the negative pole of said power source;
   a third resistor connected at one end thereof to the positive pole of said power source;
   a Zener diode whose cathode is connected to the other end of said third resistor and whose anode is connected to the negative pole of said power source;
   a series circuit including fourth and fifth resistors connected in parallel to said Zener diode;
   said switching means including an operational amplifier;
   a sixth resistor connecting a contact point between said fourth and fifth resistors and one of the input ends of said operational amplifier;
   a seventh resistor connecting the emitter of said photo-transistor and the other of the input ends of said operational amplifier; and
   an eighth resistor connecting the other of the input ends of said operational amplifier and an output end of said operational amplifier.

7. A rotation detector, comprising:
   light emitting means adapted to be energized for emitting light;
   light receiving means for sensing the light emitted from said light emitting means and providing output signals;
   rotary means interposed between said light emitting means and said light receiving means, and adapted to be rotatably driven by a driving source, for causing the light emitted from said light emitting means to be sensed in intermittently interrupted states by the light receiving means;

comparing means for comparing said output signals from said light receiving means with a preset threshold and outputting a detection signal with said output signal is beyond said threshold;

said light emitting means including an emission diode biased in a favorable direction and said light receiving means including a photo-transistor;

a first resistor connecting the cathode of said emission diode and the negative pole of said power source;

a second resistor connected at one end thereof to the negative pole of said power source;

a third resistor connected at one end thereof to the positive pole of said power source;

a Zener diode whose cathode is connected to the other end of said third resistor and whose anode is connected to the negative pole of said power source;

a series circuit including fourth and fifth resistors connected in parallel to said Zener diode;

said comparing means including an operational amplifier;

a sixth resistor connecting a contact point between said fourth and fifth resistors and one of the input ends of said operational amplifier;

a seventh resistor connecting the emitter of said photo-resistor and the other of the input ends of said operational amplifier; and an eighth resistor connecting the other of the input ends of said operational amplifier and an output end of said operational amplifier.

8. A rotation detector, comprising:

an emission diode whose anode is connected to a positive pole of a power source;

a photo-transistor whose collector is connected to a positive pole of said power source;

rotary means interposed between said emission diode and said photo-transistor, and rotatably driven by a driving source, for causing the light emitted from said emission diode to be sensed in intermittently interrupted states by said photo-transistor;

a first resistor connecting the cathode of said emission diode to the negative pole of said power source;

a second resistor connecting the negative pole of said power source to the emitter of said photo-transistor;

a third resistor connected at one end thereof to the positive pole of said power source;

a Zener diode whose cathode is connected to the other end of said third resistor and whose anode is connected to the negative pole of said power source;

a series circuit including fourth and fifth resistors connected in parallel to said Zener diode;

an operational amplifier turned ON or OFF in response to signals outputted from the emitter of said photo-transistor;

a sixth resistor connecting a contact point between said fourth and fifth resistors to one of the input ends of said operational amplifier;

a seventh resistor connecting the emitter of said photo-transistor to the other of the input ends of said operational amplifier; and an eighth resistor connecting the other of the input ends of said operational amplifier to an output end of said operational amplifier.

9. A rotation detector, comprising:

an emission diode whose anode is connected to a positive pole of a power source;

a photo-transistor whose collector is connected to a positive pole of said power source;

rotary means interposed between said emission diode and said photo-transistor, and rotatably driven by a driving source, for causing the light emitted from said emission diode to be sensed in intermittently interrupted states by said photo-transistor;

a first resistor connecting the cathode of said emission diode to the negative pole of said power source;

a second resistor connecting the negative pole of said power source to the emitter of said photo-transistor;

a third resistor connected at one end thereof to the positive pole of said power source;

a Zener diode whose cathode is connected to the other end of said third resistor and whose anode is connected to the negative pole of said power source;

a series circuit including fourth and fifth resistors connected in parallel to said Zener diode;

an operational amplifier comparing said signal outputted from said photo-transistor with a preset threshold and outputting a detection signal when said signal is beyond said threshold;

a sixth resistor connecting a contact point between said fourth and fifth resistors to one of the input ends of said operational amplifier;

a seventh resistor connecting the emitter of said photo-transistor to the other of the input ends of said operational amplifier; and an eighth resistor connecting the other of the input ends of said operational amplifier to an output end of said operational amplifier.

10. A rotation detector as set forth in claim 1, 6, 7, 8 or 9, wherein said rotary means is a disk formed with slits in the circumferential direction thereof at predetermined regular intervals.

11. A rotation detector as set forth in claim 1, 6, 7, 8 or 9, wherein said light emitting means is an emission diode biased in the favorable direction and said light receiving means is a photo-transistor.

* * * * *